(12) United States Patent
Mühlegger

(10) Patent No.: US 8,096,396 B2
(45) Date of Patent: Jan. 17, 2012

(54) DRY-RUNNING FRICTION LINING

(75) Inventor: Markus Mühlegger, Pinsdorf (AT)

(73) Assignee: Miba Frictec GmbH, Laakirchen (AT)

( * ) Notice: Subject to any disclaimer, the term of this patent is extended or adjusted under 35 U.S.C. 154(b) by 817 days.

(21) Appl. No.: 12/217,608

(22) Filed: Jul. 7, 2008

(65) Prior Publication Data

US 2009/0008210 A1    Jan. 8, 2009

(30) Foreign Application Priority Data

Jul. 4, 2007  (AT) ................................ A 1025/2007

(51) Int. Cl.
*F16D 69/02* (2006.01)
(52) U.S. Cl. ................ 192/107 M; 188/251 M
(58) Field of Classification Search ........................ None
See application file for complete search history.

(56) References Cited

U.S. PATENT DOCUMENTS

| | | | |
|---|---|---|---|
| 2,818,634 A * | 1/1958 | Batchelor et al. | ............... 75/234 |
| 2,938,790 A | 5/1960 | Stedman et al. | |
| 4,384,053 A | 5/1983 | Peilloud et al. | |
| 4,456,578 A | 6/1984 | Ward | |
| 4,871,394 A * | 10/1989 | Baker et al. | ..................... 75/232 |
| 5,324,592 A | 6/1994 | Blankenhagen et al. | |
| 5,370,725 A * | 12/1994 | Kawamura et al. | ............. 75/243 |
| 5,972,070 A | 10/1999 | Kondoh et al. | |
| 6,576,070 B2 | 6/2003 | Kanaoka | |

FOREIGN PATENT DOCUMENTS

| | | |
|---|---|---|
| DE | 29 24 540 | 1/1980 |
| DE | 32 32 865 | 3/1983 |
| DE | 42 17 948 | 6/1993 |
| DE | 42 39 441 | 5/1994 |
| DE | 44 43 666 | 6/1996 |
| DE | 198 28 663 | 2/1999 |
| DE | 101 27 891 | 3/2002 |
| EP | 0 505 345 | 9/1992 |
| GB | 990 620 | 4/1965 |
| GB | 2 135 411 | 8/1984 |
| SU | 544705 A1 * | 1/1977 |

OTHER PUBLICATIONS

Translation of SU 544705 A1 by FLS, Inc. United States Patent and Trademark Office, May 2011.*

* cited by examiner

*Primary Examiner* — Richard M. Lorence
(74) *Attorney, Agent, or Firm* — Collard & Roe, P.C.

(57) ABSTRACT

The invention relates to a sintered, dry-running friction lining containing no binding agent with a friction lining body comprising a metallic matrix, at least one abrasive material and at least one filler. The friction lining body has a porosity which is greater than 10%. The proportion of the at least one abrasive material in the friction lining body is at most 5% by weight.

17 Claims, 1 Drawing Sheet

DRY-RUNNING FRICTION LINING

CROSS REFERENCE TO RELATED APPLICATIONS

Applicant claims priority under 35 U.S.C. §119 of AUSTRIAN Patent Application No. A 1025/2007 filed on Jul. 4, 2007.

BACKGROUND OF THE INVENTION

1. Field of the invention

The invention relates to a sintered, dry-running friction lining with no binding agent, with a friction lining body comprising a metallic matrix, at least one abrasive material and at least one filler, a dry-running friction component with a base part to which a friction lining is joined, as well as a friction unit with at least one dry-running friction component.

2. Prior Art

Organically resin-bonded friction linings are used in conventional dry-running transmission systems of automotive vehicles.

Patent specification DE 29 24 540 A, for example, describes a product for producing components with a metallic composition, made up of at least a fine steel fiber powder with a loose density of between 0.2 and 1.5 g/cm$^3$, the carbon content of which is between 0.95 und 1.10% by weight, and the chromium content of which is between 1.3 and 1.6% by weight, which is heat treated so that the microscopic structure, as viewed from an inspection plane intersecting a metal particle, exhibits a fine distribution of spherical iron and chromium carbide based on the formula $(FeCr)_3C$ in a mixed base mass of high-strength martensite and deformable austenite. This fibrous powder is used for a friction lining for brakes in a proportion of 30 to 85% by weight and this friction lining additionally contains mineral and organic fillers of a type and in amounts which satisfy the operating properties required of the lining. It is used in particular to produce friction linings for clutches or brakes. The friction linings contain between 10 and 20% of polymerisable phenol binders.

These materials are distinctive due to a low tendency to friction-induced vibrations (e.g. clutch engagement) but can be used only at very low temperatures and energy loads, mainly due to the raw materials used for the matrix, in other words the resin.

Modern drive trains are becoming increasingly lightweight but must be capable of transmitting higher powers whilst improving driving comfort and fuel efficiency at the same time. Due to the need to keep the vehicle weight as low as possible, the size of clutches is very severely limited. This in turn has a major effect on the stresses of the friction lining because less mounting space for the clutch means smaller lining surfaces, resulting in higher energy and temperature loads on the friction material.

The metallic friction linings available these days, however, are all capable of withstanding very high energy and thermal loads, have high coefficients of friction and low abrasion, but do have a very strong tendency to friction vibration which can spread through the entire drive train and thus have a very negative effect on the driving comfort of the vehicle.

Other friction components are described in the prior art, in which the friction lining is made from sintered materials. For example, patent specification DE 44 43 666 A describes a component, in particular a synchronizer ring, with friction surfaces for synchronizing friction in automotive gear systems. Here too, this invention is driven by the move towards increasing miniaturization and ever more demanding requirements in terms of power transmission and shifting comfort. The material used for the friction surfaces of the component in this DE-A is a sintered bronze which is superficially largely free of pores and contains metallic and non-metallic additives to improve friction behavior, wear resistance and shifting comfort in the form of up to 6% by weight zinc, up to 6% by weight of nickel, up to 3% by weight of molybdenum, 1 to 6% by weight of $SiO_2$ and/or $Al_2O_3$, optionally 0.2 to 6% by weight of graphite and/or molybdenum disulphide, the rest being bronze of a defined particle size in the initial powder. This sintered bronze is intended for oil-lubricated parts for synchronizing friction in automotive gear systems.

Patent specification DE 42 39 441 A, on the other hand, addresses the problem of producing friction materials of a reduced density, in particular friction linings of dry clutches, and proposes subjecting a blank containing the components of the friction materials to a pressing process and optionally a first thermal finishing treatment and/or a final thermal treatment, and one or more reagents are added to the blank prior to the pressing process, which lead to a reduction in the density of the end product due to the fact that they escape by forming a gas or/and react due to the splitting of gaseous molecules or/and completely decompose into volatile elements during the pressing process, the first thermal finishing treatment or/and the final thermal treatment, and the pressing operation and optionally the first thermal finishing treatment or/and the thermal final treatment are operated in such a way that shrinkage of the blank is prevented as far as possible.

Patent specification DE 42 17 948 C discloses a method of producing porous friction surfaces on friction elements on a synchronizer unit. The friction surface is formed by a sintered body made from sintered grains. The friction surface is ground and, after grinding, treated with a jet of gaseous or liquid medium so that side edges created on the sintered grains constituting the surface of the friction surface during the process of grinding the friction surface are broken away from the sintered grains due to the mechanical action of the jet and fed away from the sintered body. As a result, the accesses to the pore cavities of the sintered friction body are made free again after grinding so that the entire storage capacity of the friction body is made available again without any restrictions. The intention is to allow lubricants to penetrate and be stored in lubricated friction pairings.

Patent specification DE 32 32 865 A discloses a method and a device for producing a friction element for a motor vehicle or motor bicycle disc brake. To this end, a powdered friction material is placed in a mould cavity and compacted. A first and a second resistance electrode are used for this purpose. As a result, the friction material is sintered and joined to a pressure plate closing off one end of the mould cavity. The first electrode has an end surface which can be moved into contact with the pressure plate and has a cut-out provided in it which is partially filled with a graphite insert which has a lower electrical conductivity than the rest of the first electrode. The second electrode may be provided with a similar insert and may come into contact with the friction material either directly or via a sub-electrode made from graphite disposed in between. This results in a good electrical contact between the friction material and the electrode and a uniform current flow through the material. The material used for the friction lining is a powder containing copper, tin, lead and graphite, silicon oxide, aluminum oxide and molybdenum disulphide in various compositions. The proportion of silicon oxide used is 1.0 and 2.8% by weight and that of aluminum oxide between 4.9 and 9.7% by weight. Another option is to use silicon nitride in a proportion of 8.3 percent by weight.

This enables friction linings of differing porosities to be produced, the final density of which is in the range of between 72.6% and 90.5%.

SUMMARY OF THE INVENTION

The objective of the invention is to propose a friction lining with low friction vibration for dry running applications, in other words without oil.

This objective is achieved, independently in each case, by the dry-running friction lining outlined above in which the friction lining body has a porosity which is greater than 10% and the proportion of the at least one abrasive material in the friction lining body is at most 5% by weight, and by a dry-running friction component provided with the friction lining proposed by the invention, as well as a friction unit in which at least one dry-running friction component is of the design proposed by the invention.

On this basis, it has been found that, in spite of the low proportion of abrasive materials, a satisfactory friction effect is nevertheless obtained, and this low proportion of abrasive materials significantly reduces friction vibration. Due to the open-pored structure, this friction lining nevertheless exhibits the requisite coefficients of friction. This friction lining is therefore easy to produce, because lower compaction pressures are needed when producing the green compact in order to obtain the desired porosity of the friction lining. Furthermore, the sintering temperature can also be reduced, likewise due to the high porosity of the sintered body, because there is no need for dense sintering. The porosity also results in additional damping of vibrations induced by engagement.

In this respect, the porosity of the friction lining body may be selected from a range with a lower limit of 15% and an upper limit of 40%. Specifically in this range, it was found that a balanced ratio of friction effect and durability of the friction lining is obtained.

In order to improve these properties still further, the porosity of the friction lining body may be selected from a range with a lower limit of 20% and an upper limit of 35%, in particular from a range with a lower limit of 25% and an upper limit of 30%.

The porosity is therefore determined by the ratio of the density of the friction lining body to the theoretical density of the entire material.

The proportion of metallic matrix in the friction lining body may be selected from a range with a lower limit of 60% by weight and an upper limit of 90% by weight. Specifically as a result of this high proportion, a satisfactory heat conduction is achieved through the metallic matrix away from the friction surface, which means that overheating of the friction lining can be reduced in spite of the high porosity.

The proportion of metallic matrix in the friction lining body may also be selected from a range with a lower limit of 70% and an upper limit of 80%, likewise as a means of further improving these properties.

It should be pointed out at this stage that the remaining proportion of the friction lining apart from the metallic matrix and the abrasive materials is made up of at least one filler.

For the metallic matrix, it is preferable to select at least one metal or a metal alloy which has a Vickers hardness selected from a range with a lower limit of 30 HV10 and an upper limit of 80 HV10. Using metals of this hardness means that it is possible to obtain at least a part of the abrasive effect of the friction lining from the metallic matrix, especially if the metallic matrix is not subjected to a finishing treatment of polishing or similar in order to smooth the surface.

In particular, at least one metal or metal alloy is used for the metallic matrix, which has a Vickers hardness selected from a range with a lower limit of 40 HV10 and an upper limit of 60 HV10.

It was found that a particularly low friction vibration behavior can be obtained with dry-running friction linings in which the metallic matrix is made up of at least one element selected from a group comprising copper, iron, tin, zinc or alloys and mixtures thereof.

The proportion of the at least one filler in the friction lining may be selected from a range with a lower limit of 5% by weight and an upper limit of 35% by weight. This enables the friction vibration behavior to be reduced still further.

By particular preference, the filler is a silicate filler, and in one specific embodiment is selected from a group comprising mica, feldspar, diatomaceous earth or mixtures thereof. In particular, the latter special fillers in conjunction with the high porosity enabled high coefficients of friction to be obtained in spite of the low proportions of abrasive materials.

The at least one abrasive material may be selected from a group comprising, mullite, silicon dioxide, corundum, glass, aluminum oxide ($Al_2O_3$), and mixtures thereof, and these special abrasive materials will produce a high abrasive effect, even using such low proportions of abrasive materials.

The ratio of filler(s) to abrasive material(s) may be selected from a range with a lower limit of 1:1 and an upper limit of 5:1. Within these limits, a maximum abrasive action of the dry-running friction lining proposed by the invention was observed using a low proportion of abrasive material.

The friction lining body has a first surface and a second surface lying opposite it and the proportion of abrasive material may increase from the first surface in the direction towards the second surface. This makes it possible to obtain a design with a higher proportion of abrasive material at the outer component of a friction unit co-operating with another friction component. Alternatively, however, this also enables a better adhesion of the friction lining to a base material of a dry-running friction component to be obtained by forming toothing or micro-welding. Accordingly, it is therefore possible to opt for a higher proportion of the at least one abrasive material at one surface.

It is also possible for the metallic matrix to contain at least one solid lubricant, which is selected from a group comprising graphite, in particular natural graphite or synthetic primary or secondary graphite, coke and mixtures thereof. As a result of these solid lubricants, in spite of the high porosity and low proportion of hard or abrasive materials, a high degree of wear can be prevented, thereby resulting in high-performance linings with wear properties known from the prior art.

It is of advantage if the at least one solid lubricant is contained in the metallic matrix in a proportion selected from a range with a lower limit of 2% by weight and an upper limit of 30% by weight, which in turn means that correspondingly low wear rates can be achieved. In particular, the proportion of the at least one solid lubricant in the friction lining may be selected from a range with a lower limit of 3% by weight and an upper limit of 15% by weight, or may be selected from a range with a lower limit of 4% by weight and an upper limit of 7.5% by weight.

It is particularly preferable if the ratio of abrasive material to solid lubricant is selected from a range with a lower limit of 1:7 and an upper limit of 1:20. The wear properties were significantly improved as a result of this specific ratio of abrasive material to solid lubricant.

The ratio of abrasive material to solid lubricant is preferably 1:10.

The invention further relates to the use of the dry-running friction lining in a clutch or in a brake or in a synchronization gear.

BRIEF DESCRIPTION OF THE DRAWINGS

To provide a clearer understanding of the invention, it will be explained in more detail below with reference to examples illustrated in the appended drawings. Of the schematic diagrams.

DETAILED DESCRIPTION OF PREFERRED EMBODIMENTS

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

In order to produce a dry-running friction lining as proposed by the invention, a sinter powder of the following composition was used. All the figures are given as a % by weight.

Example 1

60.0% copper, 10.0% iron, 15.0% feldspar, 10.5% synthetic graphite, 4.5% aluminum oxide This powder was processed by a standard method used in powder metallurgy and known from the prior art. In particular, having been mixed, the powder was compacted in one direction to produce a green compact. The compaction pressure was between 200 MPa and 800 MPa. The compaction pressure should not exceed 1100 MPa.

Instead of compacting in only one direction, it is also possible to opt for bi-directional compaction or isostatic compaction.

The resultant green compact was sintered at a temperature in the range of 800° C. to at most 1000° C. for a period in the range of 45 minutes to 60 minutes and then cooled to room temperature. Cooling, like the sintering operation, preferably takes place under a protective gas atmosphere or a reducing atmosphere.

At this stage, it should also be pointed out that the green compact and the sintered body produced from it may be of any shape, and this will ultimately depend on the respective friction component or the respective application of the friction lining and hence on the pressing mould used.

The resultant friction material was placed on a base body made from steel and brazed onto it.

Other joining methods known from the prior art may also be used.

This part was then thermally leveled at a temperature in the range of 500° C. to 720° C. to compensate for any heat tension which might have occurred due to the brazing process and which often leads to a distortion of the base material. In a final process step, the friction lining is finally pressed to the finished dimensions. During this operation, so-called wear grooves may also be introduced.

Figure 1:
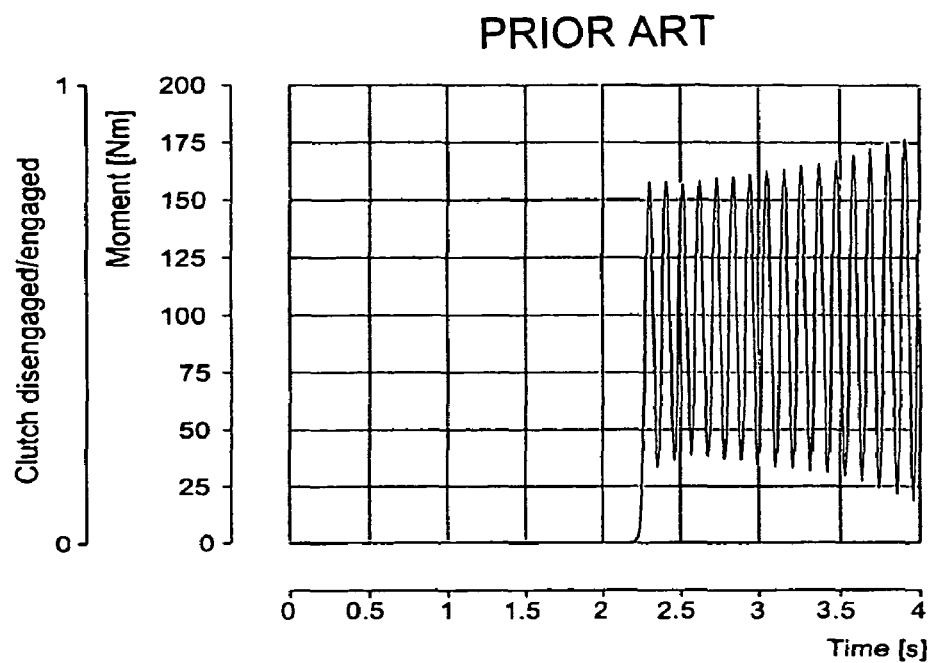
FIG. 1 is a curve plotting friction moment based on a sintered lining known from the prior art.
Figure 2:
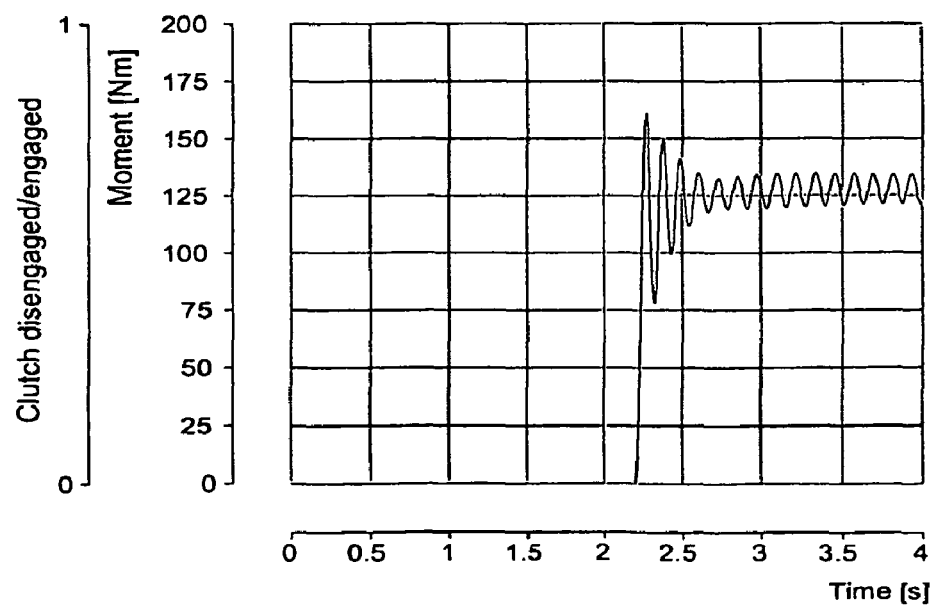
FIG. 2 is a curve plotting friction moment based on a dry-running friction lining proposed by the invention.

The resultant friction component incorporating the friction lining proposed by the invention was then tested to determine the curve of the friction moment. This curve is plotted in FIG. 2, from which it is clear that vibration behavior decreases over time, i.e. the material damps the friction vibration caused by the engaging action. By way of comparison, a friction lining known from the prior art was tested and the results are set out in FIG. 1. It is very clear that this friction lining is not able to damp vibrations and the friction vibration remains constant and there is rocking.

The friction moment was determined on a friction vibration test stand of a type known from the prior art and used in the automotive industry.

Using the method described above, friction linings based on the following compositions were also produced and the resultant friction linings tested as explained above, likewise resulting in a significantly lower friction vibration behavior. The figures given in connection with the compositions are given as a % by weight.

Example 2

60.0% copper, 2.0% tin, 20.0% diatomaceous earth, 12.0% synthetic graphite, 2.0% natural graphite, 4.0% corundum Example 3

60.0% copper, 14.0% iron, 8.0% mica, 10.5% synthetic graphite, 3.0% natural graphite, 4.5% aluminum oxide Example 4

64.0% copper, 3.0% zinc, 14.0% mica, 12.0% synthetic graphite, 5.0% coke, 2.0% silicon oxide Example 5

69.0% copper, 8.0% mica, 10.0% feldspar, 10.5% synthetic graphite, 2.5% mullite

Example 6

70.0% copper, 15.0% iron, 5.0% coke, 4.0% natural graphite, 4.5% molybdenum disulphide, 1.5% silicon oxide Example 7

75.0% copper, 8.0% diatomaceous earth, 4.0% molybdenum disulphide, 10.5% synthetic graphite, 2.5% mullite Example 8

50.0% copper, 10.0% iron, 10.0% diatomaceous earth, 15.0% mica, 9.0% synthetic graphite, 4.5% molybdenum disulphide, 1.5% silicon oxide Example 9

70.0% copper, 4.0% tin, 8.0% diatomaceous earth, 4.0% molybdenum disulphide, 8.0% synthetic graphite, 2.0% natural graphite, 4.0% corundum Example 10

40.0% copper, 25.0% iron, 20.0% diatomaceous earth, 11.5% synthetic graphite, 3.5% aluminum oxide The embodiments described as examples represent possible variants of the dry-running friction lining, and it should be pointed out at this stage that the invention is not specifically limited to the variants specifically described, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

The objective underlying the independent inventive solutions may be found in the description.

What is claimed is:

1. Sintered dry-running friction lining containing no binding agent, with a friction lining body comprising a metallic matrix, at least one abrasive material and at least one filler, wherein the friction lining body has a porosity which is greater than 10% and the proportion of the at least one abrasive material in the friction lining body is at most 5% by weight.

2. Dry-running friction lining according to claim 1, wherein the porosity of the friction lining body is selected from a range with a lower limit of 15% and an upper limit of 40%.

3. Dry-running friction lining according to claim 1, wherein the proportion of metallic matrix in the friction lining body is selected from a range with a lower limit of 60% by weight and an upper limit of 90% by weight.

4. Dry-running friction lining according to claim 1, wherein the metallic matrix is provided in the form of at least one metal or a metal alloy which has a Vickers hardness selected from a range with a lower limit of 30 HV10 and an upper limit of 80 HV10.

5. Dry-running friction lining according to claim 1, wherein the metallic matrix contains at least one element selected from a group consisting of copper, iron, tin, zinc, or alloys and mixtures thereof.

6. Dry-running friction lining according to claim 1, wherein the proportion of the at least one filler in the friction lining is selected from a range with a lower limit of 5% by weight and an upper limit of 35% by weight.

7. Dry-running friction lining according to claim 1, wherein the at least one filler is a silicate filler.

8. Dry-running friction lining according to claim 7, wherein that at least one filler is selected from a group consisting of mica, feldspar, diatomaceous earth or mixtures thereof.

9. Dry-running friction lining according to claim 1, wherein the at least one abrasive material is selected from a group consisting of mullite, silicon dioxide, corundum, glass, aluminum oxide, and mixtures thereof.

10. Dry-running friction lining according to claim 1, wherein a ratio of filler to abrasive material is selected from a range with a lower limit of 1:1 and an upper limit of 5:1.

11. Dry-running friction lining according to claim 1, wherein the friction lining body has a first surface and a second surface lying opposite it and the proportion of abrasive material increases from the first surface in the direction towards the second surface.

12. Dry-running friction lining according to claim 1, wherein the metallic matrix contains at least one solid lubricant selected from a group consisting of graphite, molybdenum disulphide, coke and mixtures thereof.

13. Dry-running friction lining according to claim 1, wherein the metallic matrix contains at least one solid lubricant selected from a range with a lower limit of 2% by weight and an upper limit of 30% by weight.

14. Dry-running friction lining according to claim 1, wherein a ratio of abrasive material to solid lubricant is selected from a range with a lower limit of 1:7 and an upper limit of 1:20.

15. Dry-running friction component with a base part to which a friction lining is joined, wherein the friction lining is as specified in claim 1.

16. Dry-running friction component according to claim 14, wherein the friction lining has a first surface and a second surface lying opposite it, and the first surface lies against the base part and the proportion of abrasive material in the friction lining increases from the first surface in the direction towards the second surface.

17. Friction unit, in particular a clutch or brake, with at least one dry-running friction component, wherein the at least one dry-running friction component is as specified in claim 15.

* * * * *